US007447789B2

(12) United States Patent
Curtis et al.

(10) Patent No.: US 7,447,789 B2
(45) Date of Patent: Nov. 4, 2008

(54) METHOD AND APPARATUS FOR BUFFERING DATA AT A TRANSPORT LAYER ON A CLIENT

(75) Inventors: Bruce W. Curtis, Dublin, CA (US); Darrin P. Johnson, Mountain View, CA (US); Hsiao-Keng J. Chu, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 235 days.

(21) Appl. No.: 11/390,551

(22) Filed: Mar. 24, 2006

(65) Prior Publication Data

US 2007/0239887 A1 Oct. 11, 2007

(51) Int. Cl.
*G06F 15/16* (2006.01)
*G06F 12/00* (2006.01)
(52) U.S. Cl. ...................... 709/230; 709/218
(58) Field of Classification Search ......... 709/230–235, 709/218; 370/412, 465, 392, 331
See application file for complete search history.

(56) References Cited

U.S. PATENT DOCUMENTS

| 2004/0190516 | A1* | 9/2004 | Williams | 370/392 |
| 2005/0053084 | A1* | 3/2005 | Abrol et al. | 370/412 |
| 2005/0237976 | A1* | 10/2005 | Walldeen et al. | 370/331 |
| 2006/0109856 | A1* | 5/2006 | Deshpande | 370/412 |
| 2006/0253605 | A1* | 11/2006 | Sundarrajan et al. | 709/238 |
| 2006/0268708 | A1* | 11/2006 | Speight et al. | 370/235 |
| 2007/0133582 | A1* | 6/2007 | Banerjee et al. | 370/412 |

OTHER PUBLICATIONS

A transport layer approach for achieving aggregate bandwidths on multi-homed mobile hosts by Sivakumar et al., ACM Sep. 23, 2003 publication, 12 pages.*

* cited by examiner

*Primary Examiner*—Zarni Maung
(74) *Attorney, Agent, or Firm*—Park, Vaughan & Fleming LLP

(57) ABSTRACT

One embodiment of the present invention provides a system that buffers data inside of a byte-stream protocol at a transport layer on a client, which is receiving the data from an external source. The system operates by receiving a configuration parameter at the transport layer from an application executing on the client, wherein the configuration parameter specifies a condition upon which data buffered at the transport layer is to be sent to the application. The system then buffers data destined for the application at the transport layer on the client, and sends the buffered data to the application when the condition specified by the configuration parameter is met. Buffering data at the transport layer on the client facilitates more efficient processing of system calls.

20 Claims, 2 Drawing Sheets

METHOD AND APPARATUS FOR BUFFERING DATA AT A TRANSPORT LAYER ON A CLIENT

BACKGROUND

1. Field of the Invention

The present invention relates to computer networks. More specifically, the present invention relates to a method and an apparatus for buffering data at a transport layer on a client.

2. Related Art

Byte-stream oriented protocols, like the Transmission Control Protocol (TCP), typically do not possess any notion of message boundaries. As a result, the receive-side stack implementation often relies on heuristics to determine when to wake up a client which is blocking, waiting for more data to read. For example, TCP uses heuristics like the presence of the PSH flag (a flag which instructs the transport layer to "push" the buffered data to the application layer), and the reception of a partial segment, to decide when to send up all the data temporarily buffered at the transport layer. These heuristics serve to reduce the number of unnecessary wakeups and read( ) system calls. However, this technique typically does not work well without the help of the application. Consequently, in most cases, the wakeup is either too early or too late.

With the rapid proliferation of resource-constrained computing devices, such as web-enabled cell phones and Personal Digital Assistants (PDAs), processing extra wakeups and read( ) system calls can be relatively expensive. Existing approaches to minimize this impact are far from optimal because they make assumptions about network traffic. Since network traffic is dynamic in nature, and these assumptions are typically represented by static variables, the existing approach cannot adapt to dynamic changes in the network, and they are typically optimized for greatest-use cases (which means they achieve sub-optimal performance for other cases).

Hence, what is needed is a method and an apparatus for buffering data at the transport layer without the problems discussed above.

SUMMARY

One embodiment of the present invention provides a system that buffers data inside of a byte-stream protocol at a transport layer on a client, which is receiving the data from an external source. The system operates by receiving a configuration parameter at the transport layer from an application executing on the client, wherein the configuration parameter specifies a condition upon which data buffered at the transport layer is to be sent to the application. The system then buffers data destined for the application at the transport layer on the client, and sends the buffered data to the application when the condition specified by the configuration parameter is met. By buffering data at the transport layer on the client, the present invention facilitates more efficient processing of system calls.

In a variation on this embodiment, the system receives an "accept call" for the buffered data from the application, wherein a prior listen call instructs the transport layer to accept a connection from the external source and to send the buffered data to the application. The system then holds the buffered data at the transport layer until all of the data expected by the accept call has been buffered at the transport layer.

In a variation on this embodiment, the condition specified by the configuration parameter can include: a number of bytes to buffer, a first timeout value which is specified as an amount of time since a first byte was received, and a second timeout value which is specified as an amount of time since the last time buffered data was sent to the application.

In a variation on this embodiment, the byte-stream protocol is the Transmission Control Protocol (TCP). Note that any transport layer control protocol including, but not limited to, TCP, Stream Control Transmission Protocol (SCTP), Datagram Congestion Control Protocol (DCCP), etc, may be used.

In a variation on this embodiment, the configuration parameter is specified as a socket option.

In a variation on this embodiment, the client may support multiple simultaneous connections between the client and multiple external sources. In this embodiment, the configuration parameter is specified per connection between the client and external sources.

In a variation on this embodiment, the system receives a new configuration parameter. The system then replaces the existing configuration parameter with the new configuration parameter.

DETAILED DESCRIPTION

Figure 1:
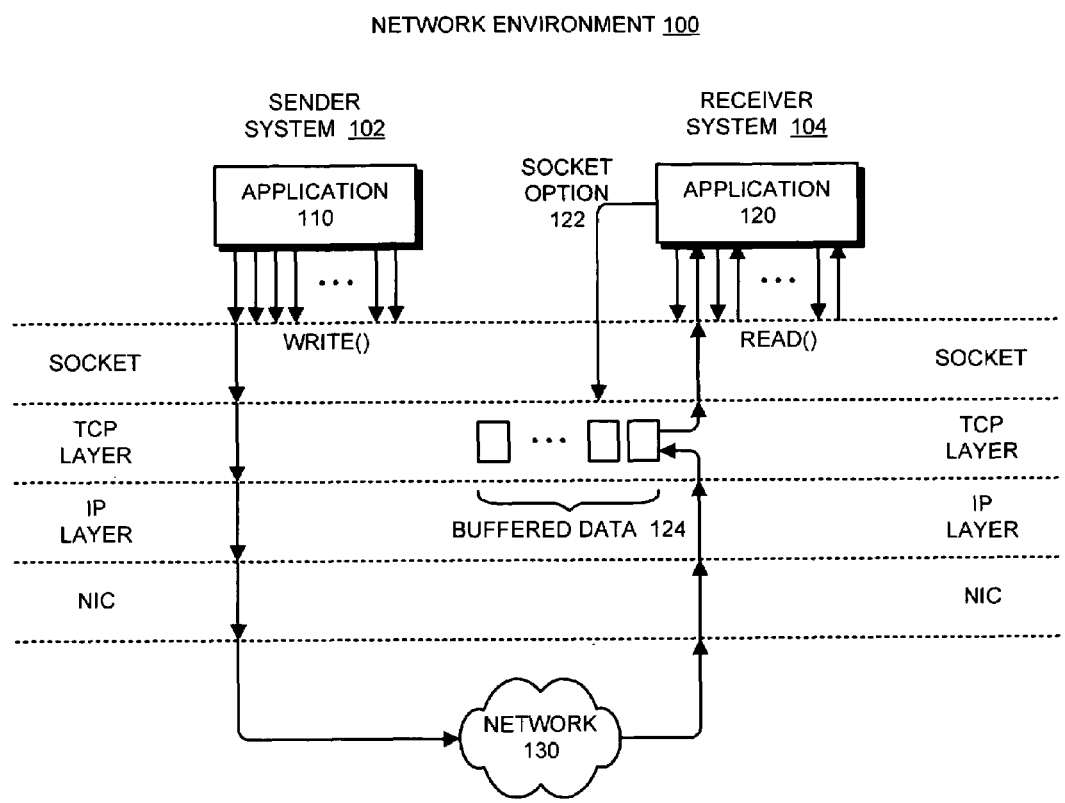
FIG. 1 illustrates a networking environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs), DVDs (digital versatile discs or digital video discs), or any device capable of storing data usable by a computer system.

Overview

One embodiment of the present invention provides a technique by which an application running on a computer system can provide hints to the network transport layer to facilitate efficiently buffering data at the transport layer.

One embodiment of the present invention proposes a new socket option, "SO_DATAWAIT," that can be issued by an application. The SO_DATAWAIT socket option tells the transport layer exactly how much data to wait for, or what to look for in the data stream before waking up the application blocking on read( ). For example, in a database application that reads a fixed size record of 5000 bytes, the application can issue SO_DATAWAIT of 5000 bytes so that the application will not be woken up until the whole record has arrived and is ready to be read. Another example where this technique is useful arises with web servers. In this example, a web server can use SO_DATAWAIT to request the TCP transport to wait for a complete HTTP request to arrive before waking up the web server.

Note that the present invention can be very useful for clients that are accessing various networks that may have very little bandwidth, or very low throughput. For example, consider the example where a user is receiving data on a web-enabled cell phone. In this example, in a traditional system, the application may receive a particular amount of data through multiple read( ) system calls, even though the data might not be useful to the application until the data has arrived at the web-enabled cell phone in its entirety. For resource-constrained computing devices such as web-enabled cell phones, all of the unnecessary read( ) system calls and the accompanying context switching can consume scarce resources and negatively effect the experience for the user. In this case, embodiments of the present invention will provide an improvement because they will allow the transport layer to receive all of the expected data before processing a read( ) system call.

Also note that embodiments of the present invention may also include improvements over the prior art when data is being received at a much faster rate than expected. In this case, the buffered data can be processed immediately upon receipt of the final byte of data because, in contrast to existing systems, the present invention will not have to wait until a timeout value is reached if a push bit is not set.

In a variation on this embodiment, one can apply the socket option to a listener so that an accept( ) system call and the subsequent read( ) system call will not return until all of the data expected by the acceptor has arrived. This allows the accept( ) and read( ) system calls to be processed in one wakeup, and can greatly reduce the number of context switches.

In a further variation, the SO_DATAWAIT socket option includes a timer value that is used to timeout the wait if the condition is not met within the specified period.

The advantage of this proposed new socket option is that it makes the accept( ) and read( ) system call processing much more efficient because a reader is only woken up when there is enough interesting data for it to process.

Computing Environment

FIG. 1 illustrates a networking environment 100 in accordance with an embodiment of the present invention. Networking environment 100 includes sender system 102, receiver system 104, and network 130.

Sender system 102 can generally include any computational node including a mechanism for servicing requests from a client for computational and/or data storage resources.

Receiver system 104 can generally include any node on a network including computational capability and including a mechanism for communicating across the network.

Network 130 can generally include any type of wired or wireless communication channel capable of coupling together computing nodes. This includes, but is not limited to, a local area network, a wide area network, or a combination of networks. In one embodiment of the present invention, network 130 includes the Internet.

In the example shown in FIG. 1, application 110 on sender system 102 is sending data to application 120 on receiver system 104, by way of network 130. To accomplish this, application 110 performs a write( ) call to a TCP socket on sender system 102. On performing the write( ) call, the data is pushed down the network stack and out to network 130. As the data reaches receiver system 104 and works its way up the network stack, the data is buffered at the transport layer (shown as buffered data 124). Note that the embodiment illustrated in FIG. 1 is specific to the Transmission Control Protocol (TCP), and the transport layer is referred to as the TCP layer. While TCP is used to illustrate one embodiment of the present invention, the present invention is not meant to be limited to TCP. In fact, any byte-stream protocol may be used. In one embodiment of the present invention, any transport layer control protocol including, but not limited to, TCP, Stream Control Transmission Protocol (SCTP), Datagram Congestion Control Protocol (DCCP), etc, may be used.

Application 120 can provide hints to the TCP layer on receiver system 104 to facilitate optimal data buffering. Application 120 accomplishes this task by issuing socket option 122. For example, socket option 122 can include an amount of data expected by application 120. If application 120 receives buffered data 124 before a useful amount of data has been received, then application 120 will have to wait until more data has been received, and will have to perform another read( ) call, thus wasting resources.

In one embodiment of the present invention, socket option 122 can include a timeout value, or any other data to help facilitate optimal data buffering.

In one embodiment of the present invention, application 120 includes a listener that is listening for incoming connections from external sources. In this embodiment, if the listener receives an accept( ) system call to accept a connection, the system will hold the subsequent read( ) system call until all of the data expected by the acceptor has arrived. This allows the accept( ) and read( ) system calls to be processed in one wakeup, thus reducing the number of context switches, thereby conserving system resources.

Note that socket option 122 can be issued per-connection, because it is possible for receiver system 104 to have multiple simultaneous connections to one or more external sources, such as sender system 102.

Buffering Data at the Transport Layer

Figure 2:
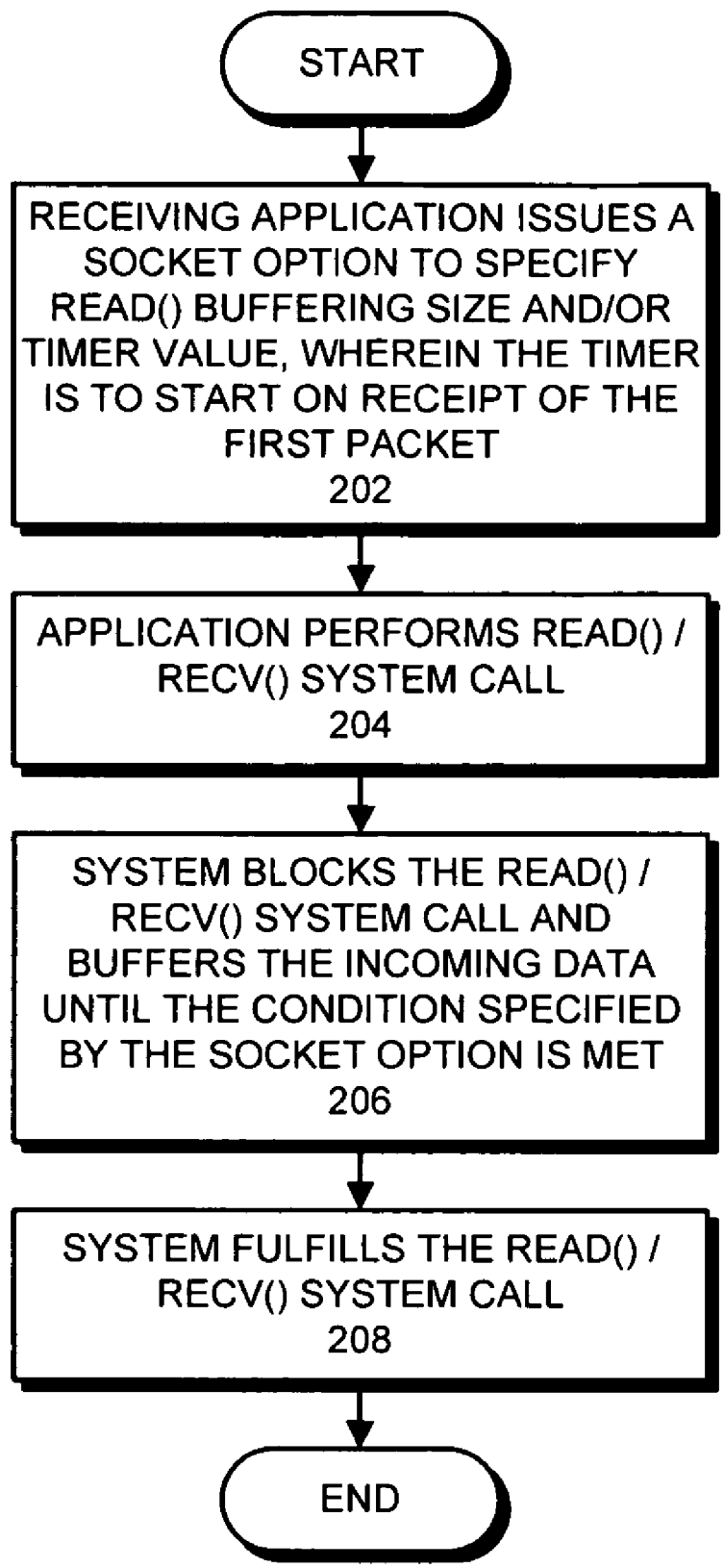
FIG. 2 presents a flowchart illustrating the process of buffering data at the transport layer in accordance with an embodiment of the present invention.

FIG. 2 presents a flowchart illustrating the process of buffering data at the transport layer in accordance with an embodiment of the present invention. The system operates when application 120 issues socket option 122 to specify a read( ) system call buffer size, and/or a timer value to start when receiver system 104 receives the first packet (step 202). When application 120 subsequently performs a read( ) or recv( ) system call (step 204), the system blocks the system call and continues to buffer the incoming data at the transport layer until the condition specified in socket option 122 is met (step 206). Once the condition is met, the system then fulfills the read( ) or recv( ) system call (step 208).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for buffering data inside of a byte-stream protocol at a transport layer on a client, which is receiving the data from an external source, the method comprising:
   receiving a configuration parameter at the transport layer from an application executing on the client, wherein the configuration parameter specifies a condition upon which data buffered at the transport layer is to be sent to the application;

buffering data destined for the application at the transport layer on the client; and sending the buffered data to the application when the condition specified by the configuration parameter is met, wherein buffering data at the transport layer on the client facilitates more efficient processing of system calls.

2. The method of claim 1, further comprising:

receiving an accept call for the buffered data from the application, wherein a prior listen call instructs the transport layer to accept a connection from the external source and to send the buffered data to the application; and holding the buffered data at the transport layer until all of the data expected by the accept call has been buffered at the transport layer.

3. The method of claim 1, wherein the condition specified by the configuration parameter can include:

a number of bytes to buffer;

a first timeout value, which is specified as an amount of time since a first byte was received; and a second timeout value, which is specified as an amount of time since the last time buffered data was sent to the application.

4. The method of claim 1, wherein the byte-stream protocol is the Transmission Control Protocol (TCP).

5. The method of claim 1, wherein the configuration parameter is specified as a socket option.

6. The method of claim 1, wherein the client may support multiple simultaneous connections between the client and multiple external sources, and wherein the configuration parameter is specified per connection between the client and external sources.

7. The method of claim 1, further comprising:

receiving a new configuration parameter; and replacing the configuration parameter with the new configuration parameter.

8. A computer-readable storage medium storing instructions that when executed by a computer cause the computer to perform a method for buffering data inside of a byte-stream protocol at a transport layer on a client, which is receiving the data from an external source, the method comprising:

receiving a configuration parameter at the transport layer from an application executing on the client, wherein the configuration parameter specifies a condition upon which data buffered at the transport layer is to be sent to the application;

buffering data destined for the application at the transport layer on the client; and sending the buffered data to the application when the condition specified by the configuration parameter is met, wherein buffering data at the transport layer on the client facilitates more efficient processing of system calls.

9. The computer-readable storage medium of claim 8, wherein the method further comprises:

receiving an accept call for the buffered data from the application, wherein a prior listen call instructs the transport layer to accept a connection from the external source and to send the buffered data to the application; and holding the buffered data at the transport layer until all of the data expected by the accept call has been buffered at the transport layer.

10. The computer-readable storage medium of claim 8, wherein the condition specified by the configuration parameter can include:

a number of bytes to buffer;

a first timeout value, which is specified as an amount of time since a first byte was received; and a second timeout value, which is specified as an amount of time since the last time buffered data was sent to the application.

11. The computer-readable storage medium of claim 8, wherein the byte-stream protocol is the Transmission Control Protocol (TCP).

12. The computer-readable storage medium of claim 8, wherein the configuration parameter is specified as a socket option.

13. The computer-readable storage medium of claim 8, wherein the client may support multiple simultaneous connections between the client and multiple external sources, and wherein the configuration parameter is specified per connection between the client and external sources.

14. The computer-readable storage medium of claim 8, wherein the method further comprises:

receiving a new configuration parameter; and replacing the configuration parameter with the new configuration parameter.

15. An apparatus configured for buffering data inside of a byte-stream protocol at a transport layer on a client, which is receiving the data from an external source, comprising:

a receiving mechanism configured to receive a configuration parameter at the transport layer from an application executing on the client, wherein the configuration parameter specifies a condition upon which data buffered at the transport layer is to be sent to the application;

a buffer mechanism configured to buffer data destined for the application at the transport layer on the client; and a sending mechanism configured to send the buffered data to the application when the condition specified by the configuration parameter is met, wherein buffering data at the transport layer on the client facilitates more efficient processing of system calls.

16. The apparatus of claim 15:

wherein the receiving mechanism is further configured to receive an accept call for the buffered data from the application, wherein a prior listen call instructs the transport layer to accept a connection from the external source and to send the buffered data to the application; and wherein the sending mechanism is further configured to hold the buffered data at the transport layer until all of the data expected by the accept call has been buffered at the transport layer.

17. The apparatus of claim 15, wherein the condition specified by the configuration parameter can include:

a number of bytes to buffer;

a first timeout value, which is specified as an amount of time since a first byte was received; and a second timeout value, which is specified as an amount of time since the last time buffered data was sent to the application.

18. The apparatus of claim 15, wherein the byte-stream protocol is the Transmission Control Protocol (TCP).

19. The apparatus of claim 15, wherein the configuration parameter is specified as a socket option.

20. The apparatus of claim 15, wherein the client may support multiple simultaneous connections between the client and multiple external sources, and wherein the configuration parameter is specified per connection between the client and external sources.

* * * * *